United States Patent
Kang et al.

(10) Patent No.: US 9,119,171 B2
(45) Date of Patent: Aug. 25, 2015

(54) APPARATUS AND METHOD FOR SUPPORTING LOCATION UPDATE REGISTRATION PROCESS IN MACHINE TO MACHINE COMMUNICATION SYSTEM

(75) Inventors: Hyun-Jeong Kang, Seoul-si (KR); Rakesh Taori, Suwon-si (KR); Ji-Cheol Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 918 days.

(21) Appl. No.: 13/225,824

(22) Filed: Sep. 6, 2011

(65) Prior Publication Data

US 2012/0058764 A1   Mar. 8, 2012

(30) Foreign Application Priority Data

Sep. 8, 2010   (KR) .................... 10-2010-0088121

(51) Int. Cl.
*H04W 4/00* (2009.01)
*H04W 60/02* (2009.01)

(52) U.S. Cl.
CPC .................................. *H04W 60/02* (2013.01)

(58) Field of Classification Search
CPC ........ H04W 8/02; H04W 60/00; H04W 60/04
USPC ....................................... 455/435.1; 370/338
See application file for complete search history.

(56) References Cited

U.S. PATENT DOCUMENTS

| 2004/0254980 A1* | 12/2004 | Motegi et al. ................. 709/203 |
| 2007/0298725 A1* | 12/2007 | Ryu ................................ 455/68 |
| 2009/0227265 A1* | 9/2009 | Kang et al. ................. 455/456.1 |
| 2010/0189036 A1 | 7/2010 | Liu et al. |
| 2010/0248768 A1* | 9/2010 | Nakatsugawa ................ 455/509 |

FOREIGN PATENT DOCUMENTS

| KR | 10-2007-0114933 A | 12/2007 |
| KR | 10-2010-0019306 A | 2/2010 |
| KR | 10-2010-0042204 A | 4/2010 |

OTHER PUBLICATIONS

3rd Generation Partnership Program; 3rd Generation Partnership Project; Technical Specification Group Services and System Aspects; System Improvements for Machine-Type Communications (Release 10); TR 23.888 V0.5.1; Jul. 2010.

\* cited by examiner

*Primary Examiner* — Marcos Batista
(74) *Attorney, Agent, or Firm* — Jefferson IP Law, LLP

(57) ABSTRACT

An apparatus and method for supporting a location update registration process used for an idle mode operation of a Mobile Station (MS) in a Machine-to-Machine (M2M) communication are provided. The method includes determining whether a system global location update registration timer is applied to the MS, when it is determined that the global location update registration timer is not applied, determining a timer for updating a location when the MS operates in an idle mode, and transmitting a message including the timer to the MS.

34 Claims, 11 Drawing Sheets

APPARATUS AND METHOD FOR SUPPORTING LOCATION UPDATE REGISTRATION PROCESS IN MACHINE TO MACHINE COMMUNICATION SYSTEM

PRIORITY

This application claims the benefit under 35 U.S.C. §119(a) of a Korean patent application filed in the Korean Intellectual Property Office on Sep. 8, 2010 and assigned Serial No. 10-2010-0088121, the entire disclosure of which is hereby incorporated by reference.

BACKGROUND OF THE INVENTION

1. Field of the Invention

The present invention relates to a system for supporting machine-to-machine communication. More particularly, the present invention relates to an apparatus and a method for supporting a location update registration process used for an idle mode operation of a mobile station in a machine-to-machine communication system.

2. Description of the Related Art

Research is being conducted on a Machine-to-Machine (M2M) communication service supporting data communication between devices in which there is little or very limited human interaction. The M2M communication service is drawing attention in terms of cost reduction in managing devices through automatic control and communication, and is recognized as a technique applicable to fleet management of vehicles and products mounted to the vehicles, smart metering, home automation, and healthcare.

An M2M communication system supporting the M2M communication should consider support of a device which transmits and receives limited data only during a restricted time, differently from a mobile station in a general communication system. For example, a smart metering device may only transmit a value measured once a month to a smart metering server, and a healthcare device may only be updated with healthcare information from a healthcare server once a day.

Since such devices operate in an idle mode most of the time, an idle mode process defined in a wireless communication system of the related art can be applied. However, it is inefficient to apply a paging cycle of a device of the related art to the device which does not frequently transmit and receive data as described above. Also, a long paging cycle is not defined in the wireless communication system of the related art and thus should be defined.

A time-based location update registration process used in the idle mode of the wireless communication system of the related art can also be applied to the M2M communication system, whereas unique characteristics of the device should be considered. Particularly, a method for operating a location update registration timer of the related art applies the same value to mobile stations in the idle mode. When the same location update registration timer is applied to the device of the long paging cycle as in the M2M communication system, the mobile station frequently wakes up for the location update registration even when there is no data to receive. The location update registration process can cause considerable control signal overhead and power consumption of the device. Hence, it is desirable to define the location update registration process by considering the M2M communication service of the infrequent data transmission and reception as discussed above.

SUMMARY OF THE INVENTION

Aspects of the present invention address are to address at least the above-mentioned problems and/or disadvantages and to provide at least the advantages described below. Accordingly, an aspect of the present invention is to provide an apparatus and a method for supporting a location update registration process used for an idle mode operation of a mobile station in a machine-to-machine communication system.

Another aspect of the present invention is to provide an apparatus and a method for defining a new location update registration timer for a mobile station operating in an idle mode using a long paging cycle in a machine-to-machine communication system.

Yet another aspect of the present invention is to provide an apparatus and a method for negotiating a time-based location update registration timer used in a location update registration process used for an idle mode for a mobile station operating in the idle mode using a long paging cycle in a machine-to-machine communication system.

Still another aspect of the present invention is to provide an apparatus and a method for reducing control signal overhead of a location update registration process of a mobile station and power consumption of a mobile station in a machine-to-machine communication system.

In accordance with one aspect of the present invention, an operating method of a system controller in a system supporting Machine-to-Machine (M2M) communication is provided. The method includes determining whether a system global location update registration timer is applied to a Mobile Station (MS), when it is determined that the global location update registration timer is not applied, determining a timer for updating a location when the MS operates in an idle mode, and transmitting a message including the timer to the MS.

In accordance with another aspect of the present invention, an operating method of an MS in a system supporting M2M communication is provided. The method includes receiving a message including a timer for location update in an idle mode operation of the MS, and performing a location update registration process according to the received timer.

In accordance with yet another aspect of the present invention, an apparatus of a system controller in a system supporting M2M communication is provided. The apparatus includes a controller for determining whether a system global location update registration timer is applied to an MS and, for determining a timer for location update in an idle mode of the MS when it is determined that the global location update registration timer is not applied, and a transceiver for transmitting a message including the timer to the MS.

In accordance with still another aspect of the present invention, an apparatus of an MS in a system supporting M2M communication is provided. The apparatus includes a transceiver for receiving a message including a timer for location update in an idle mode operation of the MS, and a controller for performing a location update registration process according to the received timer.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, like reference numerals will be understood to refer to like parts, components and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Exemplary embodiments of the present invention provide a technique for supporting a time-based location update registration process in an idle mode of a device in a Machine-to-Machine (M2M) communication system.

Hereinafter, for convenience in description, the device is referred to as a Mobile Station (MS). A network entity for managing a timer used for a location update registration process used in an idle mode of the MS is referred to as a system controller. However, the system controller can be referred to as a paging controller.

Figure 1:
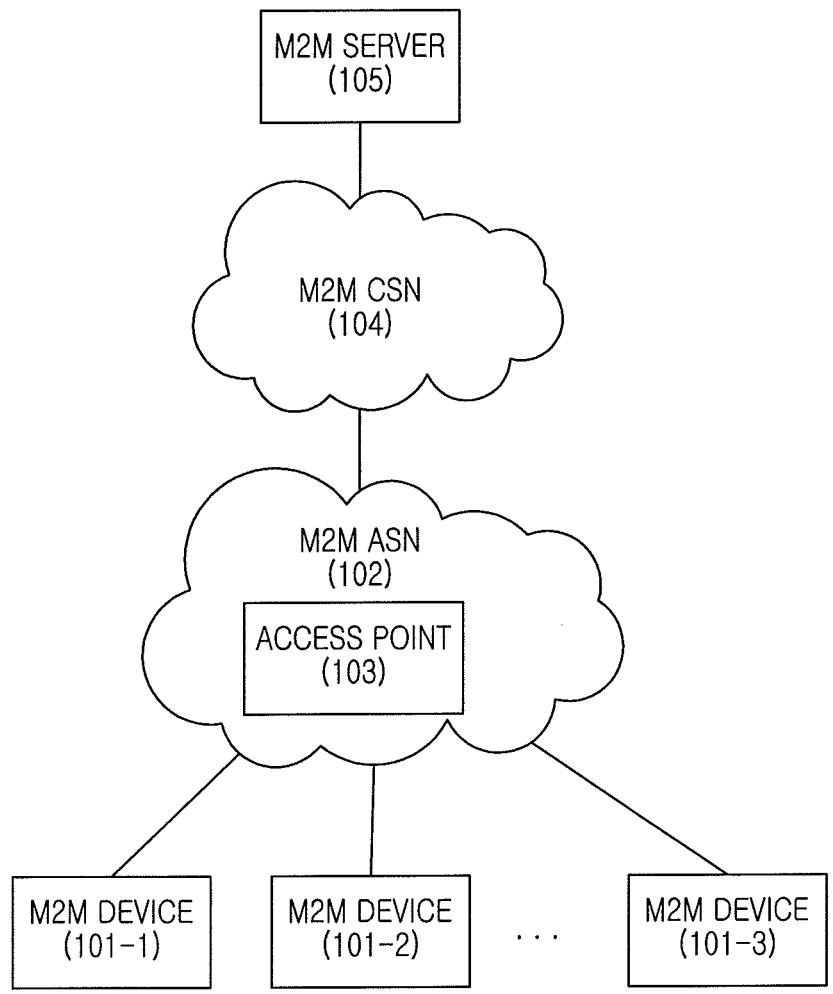
FIG. 1 is a diagram of a Machine-to-Machine (M2M) communication system supporting M2M communication according to an exemplary embodiment of the present invention.

FIG. 1 is a diagram of a M2M communication system supporting M2M communication according to an exemplary embodiment of the present invention.

Referring to FIG. 1, the M2M communication system includes M2M devices 101-1, 101-2, and 101-3 supporting the M2M communication, an M2M Access Service Network (ASN) 102 supporting the M2M communication, an Access Point (AP) 103, which is part of the M2M ASN 102, for providing radio access of the M2M devices 101-1, 101-2, and 101-3, an M2M Connection Service Network (CSN) 104 supporting the M2M communication, and an M2M server 105 supporting the M2M communication.

The M2M devices 101-1, 101-2, and 101-3 are MSs containing an installed application used for the M2M communication. The ASN 102 provides a wireless AP for the communication between the M2M devices 101-1, 101-2, and 101-3 and the M2M server 105. The AP 103 is a base station for controlling radio resources used for the communication between the M2M devices 101-1, 101-2, and 101-3 and the M2M server 105. The M2M CSN 104 provides a user connection service to the M2M devices 101-1, 101-2, and 101-3. The M2M server 105 communicates with one or more M2M devices 101-1, 101-2, and 101-3, contains an application program installed for the M2M communication, and includes an interface for user access. The M2M server 105 can belong to the M2M CSN 104 according to the system management.

In the M2M communication system, an air interface between the M2M devices 101-1, 101-2, and 101-3 and the AP 103 can employ according to an Institute of Electrical and Electronics Engineers (IEEE) 802.16 communication system standard. In this case, the M2M devices 101-1, 101-2, and 101-3 can function as the MS defined in the IEEE 802.16 communication system.

Figure 2:
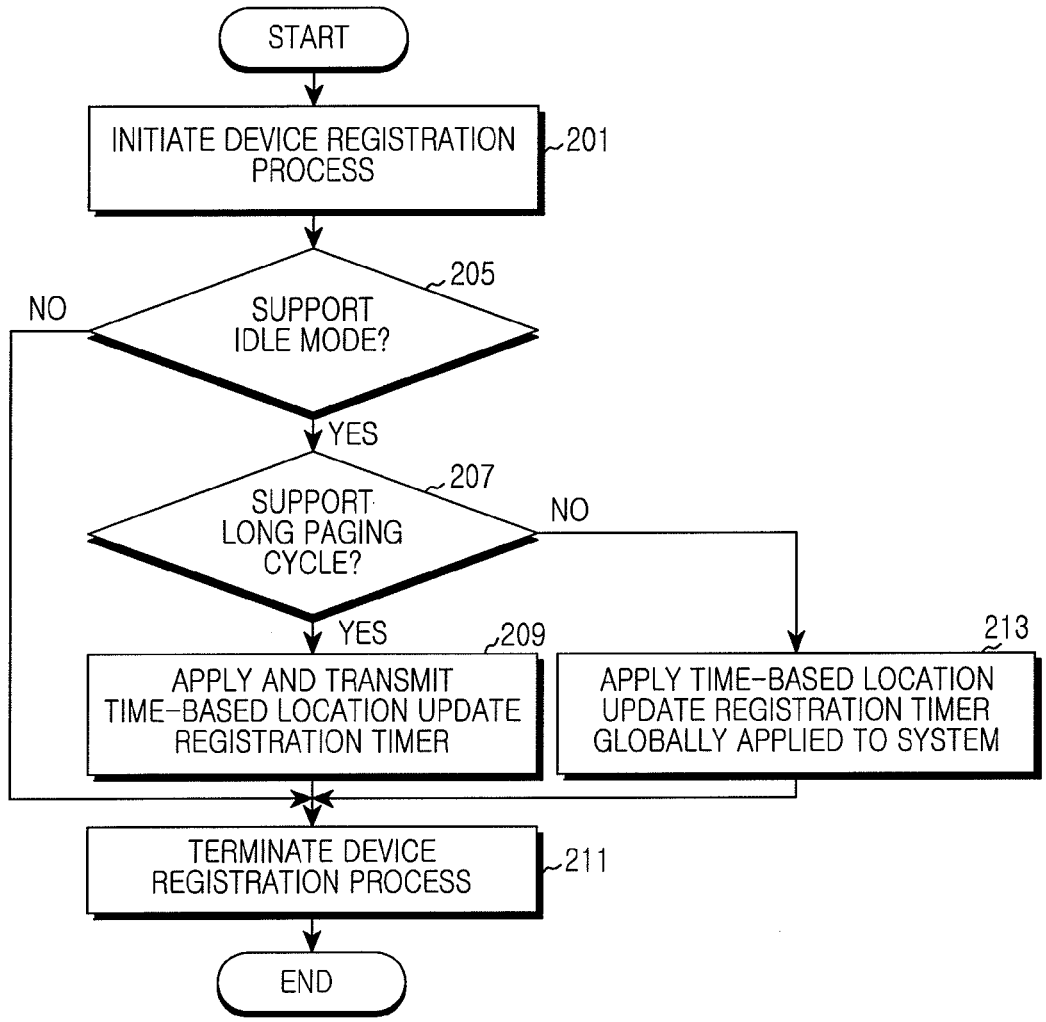
FIG. 2 is a flowchart of a method of a system controller for controlling a time-based location update registration timer of a mobile station in a device registration process of a M2M communication system according to an exemplary embodiment of the present invention.

FIG. 2 is a flowchart of a method of a system controller for controlling a time-based location update registration timer of a MS in a device registration process of a M2M communication system according to an exemplary embodiment of the present invention. Herein, the system controller includes a location update registration timer controller, a transmitter, and a receiver.

Referring to FIG. 2, the system controller initiates the device registration process; that is, a network entry process of the MS, in step 201.

In step 205, the system controller determines whether the MS supports an idle mode.

When determining that the MS does not support the idle mode in step 205, the system controller performs the remaining device registration process and terminates the device registration process of the MS in step 211, and then finishes this process.

When determining that the MS supports the idle mode in step 205, the system controller determines whether the MS supports a long paging cycle in step 207. That is, by checking the paging cycle of the MS, the system controller determines whether the checked paging cycle of the MS is greater than a reference value. Herein, the long paging cycle support of the MS implies that a paging cycle value other than a paging cycle value defined according to the related art should be applied. The paging cycle of an exemplary embodiment of the present invention is longer than the reference value (e.g., 1 day, 1 week, 1 month, etc.) since power consumption of the MS is not efficient, even when the longest paging cycle value defined in the communication system according to the related art is applied to the MS. Herein, information of whether the MS supports the long paging cycle is acquired by obtaining a device class or preset device characteristics of the MS.

When it is determined that the MS supports the long paging cycle in step 207, the system controller determines and applies a time-based location update registration timer adequate for the MS as a device-specific timer for the MS to use in the time-based location update registration process in the idle mode, based on characteristics of a service (e.g., an M2M service) subscribed to by the MS and transmits the determined time-based location update registration timer to the MS in step 209, and then proceeds to step 211. Also, the system controller sets the paging cycle of the MS based on the characteristics of the service (e.g., the M2M service) subscribed to by the MS. Herein, the time-based location update registration process indicates a periodic location update registration process of the MS in the idle mode, and the cycle complies with the time-based location update registration timer.

Meanwhile, the time-based location update registration timer information can be contained in a registration response message received at the MS in the device registration process, an exemplary construction of which is shown in Table 1. The registration response message is a message transmitted from the base station to the MS, and the system controller provides the time-based location update registration timer information to the base station using another control message.

TABLE 1

| Field | Description |
|---|---|
| Idle mode timer | MS timed interval to conduct timer based location update. Timer recycles on successful idle mode location update. |

The time-based location update registration timer information is also managed by the system controller for the MS, an exemplary construction of which is shown in Table 2.

TABLE 2

| Field | Description |
|---|---|
| Idle mode system timer | For paging controller, timed interval to receive notification of MS idle mode location update. Timer recycles on successful idle mode location update. |

In contrast, when it is determined that the MS does not support the long paging cycle in step 207, that is, when the MS does not need to support the long paging cycle, the system controller determines and applies the time-based location update registration timer globally applied to the system as the timer to use in the time-based location update registration process of the MS of the idle mode in step 213, and then proceeds to step 211. Herein, the time-based location update registration timer globally applied to the system is a value preset to a general MS supporting the idle mode without a separate control message, and corresponds to a default location update registration timer also applied to the MS supporting the M2M communication.

Figure 3:
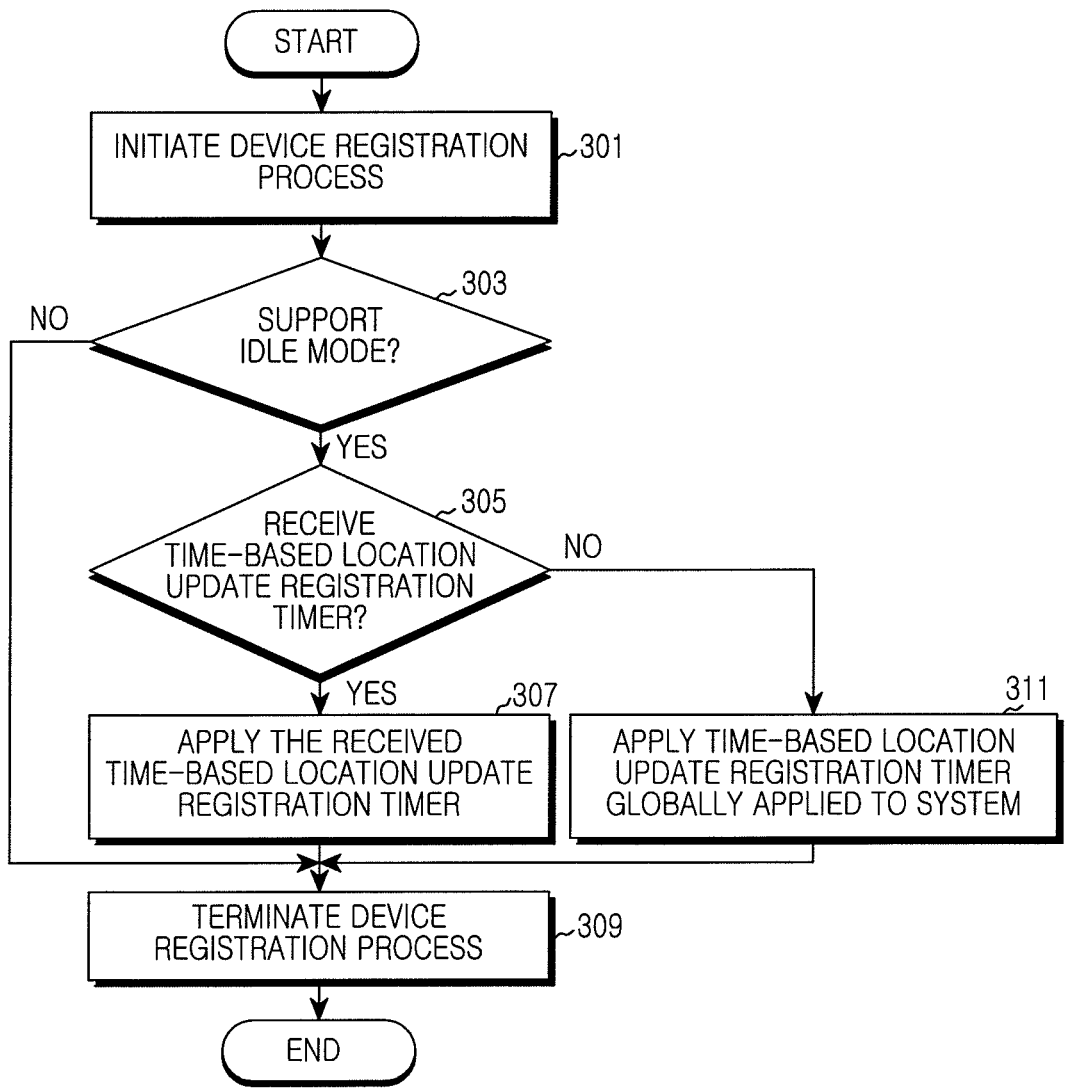
FIG. 3 is a flowchart of a method of a mobile station for processing a location update registration timer in a device registration process of a M2M communication system according to an exemplary embodiment of the present invention.

FIG. 3 is a flowchart of a method of a MS for processing a location update registration timer in a device registration process of a M2M communication system according to an exemplary embodiment of the present invention. Herein, the MS includes a location update registration timer processor, a transmitter, and a receiver.

Referring to FIG. 3, the MS initiates the device registration process; that is, the network entry process, in step 301.

In step 303, the MS determines whether it supports the idle mode.

When determining that the MS does not support the idle mode in step 303, the MS performs the remaining device registration process and terminates the device registration process in step 309, and then finishes this process.

When determining that the MS supports the idle mode in step 303, the MS determines whether a device-specific time-based location update registration timer is received in step 305. Herein, the time-based location update registration timer information can be contained in the registration response message received at the MS in the device registration process, an exemplary construction of which is shown in Table 1.

Upon determining that the time-based location update registration timer is received in step 305, the MS applies the received device-specific time-based location update registration timer as the timer to use in the time-based location update registration process in the idle mode in step 307, and proceeds to step 309. That is, when the timer expires, the MS performs the location update process.

In contrast, upon determining that the time-based location update registration timer is not received in step 305, the MS applies the time-based location update registration timer globally applied to the system as the timer to use in the time-based location update registration process in the idle mode in step 311, and then proceeds to step 309. Herein, the time-based location update registration timer globally applied to the system corresponds to the default location update registration timer preset to the MS without a separate control message.

So far, the method for determining the location update registration timer for the MS to use in the idle mode in a process of the device registration process has been illustrated. According to another exemplary embodiment, the location update registration timer can be determined in a process of the idle mode negotiation process, rather than the device registration process, of the MS to enter the idle mode. Now, a method for determining the location update registration timer during the idle mode negotiation process of the MS is explained by referring to FIGS. 4 and 5.

Figure 4:
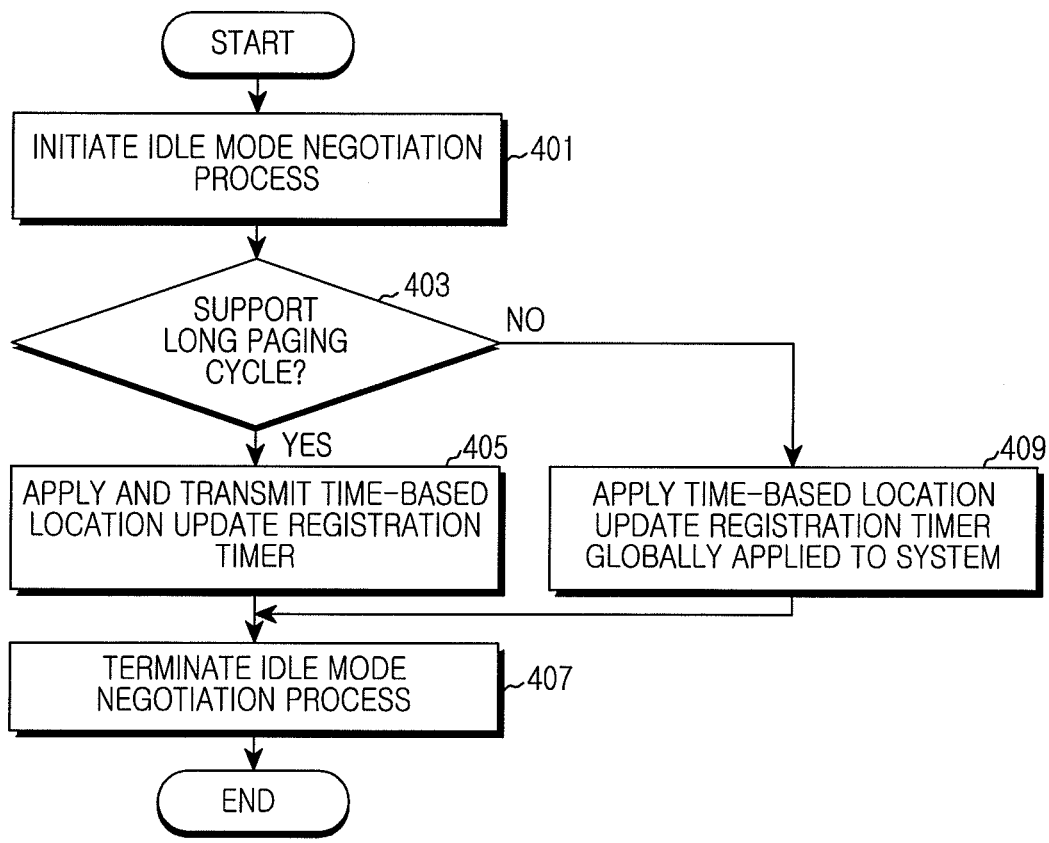
FIG. 4 is a flowchart of a method of a system controller for controlling a location update registration timer of a mobile station in an idle mode negotiation process of a M2M communication system according to an exemplary embodiment of the present invention.

FIG. 4 is a flowchart of a method of a system controller for controlling a location update registration timer of a MS in an idle mode negotiation process of a M2M communication system according to an exemplary embodiment of the present invention.

Referring to FIG. 4, the system controller initiates the idle mode negotiation process of the MS in step 401.

In step 403, the system controller determines whether the MS supports the long paging cycle.

When determining that the MS supports the long paging cycle in step 403, the system controller determines and applies a device-specific time-based location update registration timer adequate for the MS as the device-specific timer for the MS to use in the time-based location update registration process in the idle mode, based on the characteristics of the service (e.g., the M2M service) subscribed to by the MS, and transmits the determined device-specific time-based location update registration timer to the MS in step 405. Also, the system controller sets the paging cycle of the MS based on the characteristics of the service (e.g., the M2M service) subscribed to by the MS. Herein, the device-specific time-based location update registration timer information can be contained in an idle mode entry response message received at the MS in the idle mode negotiation process, an exemplary construction of which is shown in Table 1. The idle mode entry response message is a message transmitted from the base station to the MS, and the system controller provides the time-based location update registration timer information to the base station using another control message. The idle mode entry response message can be referred to as a De-Registration Response (DREG-RSP) message or a DREG-Command (CMD) message.

The system controller performs the remaining idle mode negotiation process and terminates the idle mode negotiation process of the MS in step 407, and then finishes this process.

In contrast, when determining that the MS does not support the long paging cycle in step 403; that is, when the MS does not need to support the long paging cycle, the system controller determines and applies the time-based location update registration timer globally applied to the system as the timer for the MS to use in the time-based location update registration process of the idle mode in step 409, and then proceeds to step 407. Herein, the time-based location update registration timer globally applied to the system is the value preset to the general MS supporting the idle mode without a separate control message, and corresponds to the default location update registration timer also applied to the MS supporting the M2M communication.

Figure 5:
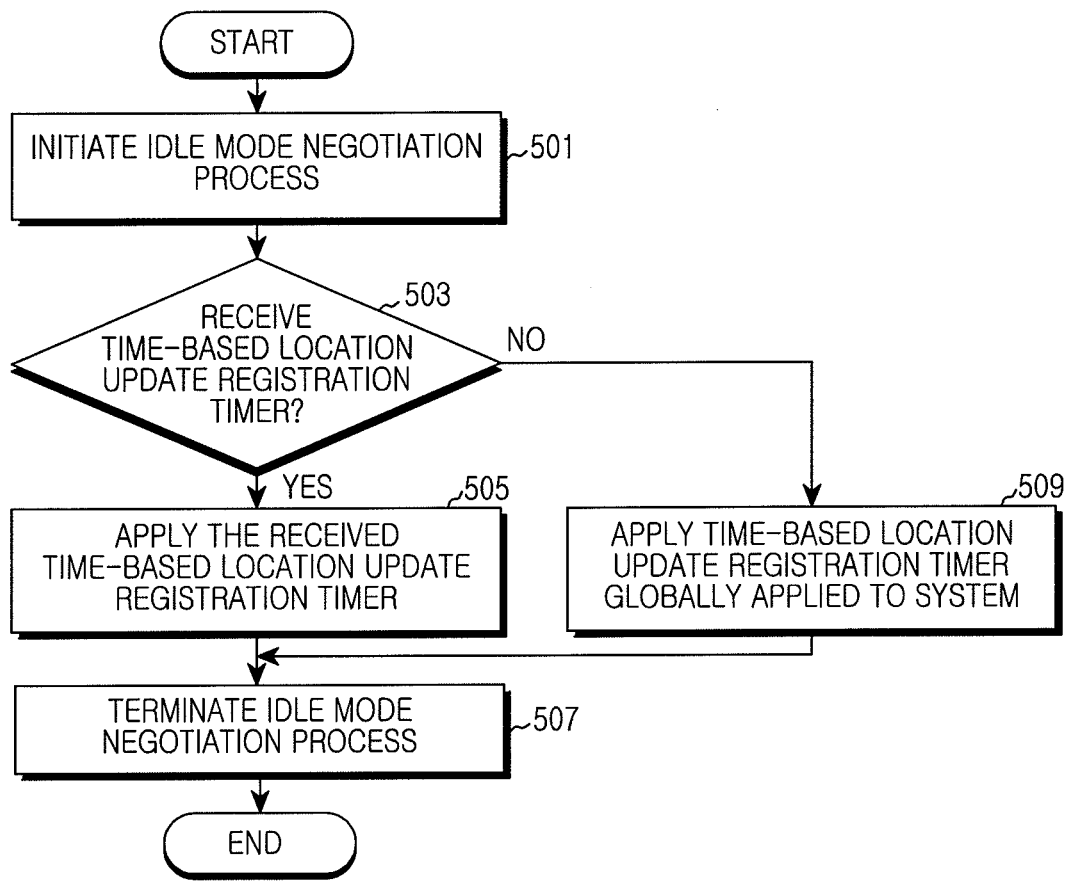
FIG. 5 is a flowchart of a method of a mobile station for processing a location update registration timer in an idle mode negotiation process of a M2M communication system according to an exemplary embodiment of the present invention.

FIG. 5 is a flowchart of a method of a MS for processing a location update registration timer in an idle mode negotiation process of a M2M communication system according to an exemplary embodiment of the present invention.

Referring to FIG. 5, the MS initiates the idle mode negotiation process in step 501.

In step 503, the MS determines whether a device-specific time-based location update registration timer is received. Herein, the device-specific time-based location update registration timer information can be contained in the idle mode entry response message (i.e., DREG-RSP) received at the MS in the idle mode negotiation process, an exemplary construction of which is shown in Table 1.

Upon determining that the device-specific time-based location update registration timer has been received in step 503, the MS applies the received time-based location update registration timer as the timer to use in the time-based location update registration process in the idle mode in step 505. That is, when the timer expires, the MS performs the location update process.

The MS performs the remaining idle mode negotiation process and terminates the idle mode negotiation process in step 507, and then finishes this process.

In contrast, when the MS determines that the time-based location update registration timer is not received in step 503, the MS applies the time-based location update registration timer globally applied to the system as the timer to be used by the MS in the time-based location update registration process in the idle mode in step 509, and then proceeds to step 507. Herein, the time-based location update registration timer globally applied to the system corresponds to the default location update registration timer preset to the MS without a separate control message.

Figure 6:
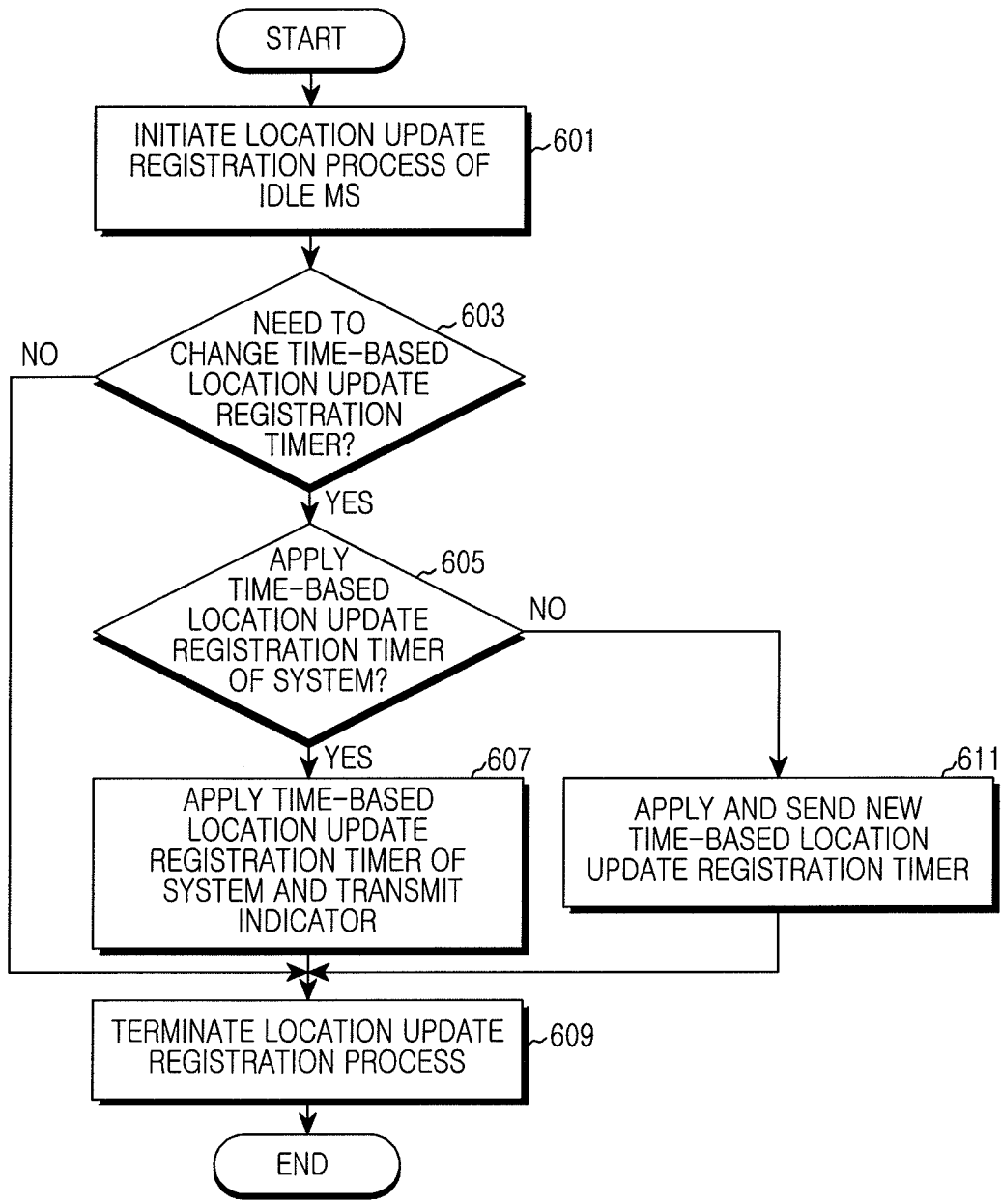
FIG. 6 is a flowchart of a method of a system controller for controlling a changed location update registration timer of a mobile station in an idle mode in a M2M communication system according to an exemplary embodiment of the present invention.

FIG. 6 is a flowchart of a method of a system controller for controlling a changed location update registration timer of a MS in an idle mode in a M2M communication system according to an exemplary embodiment of the present invention.

Referring to FIG. 6, the system controller initiates the location update registration process of the idle MS in step 601.

In step 603, the system controller determines whether it is necessary to change the time-based location update registration timer of the MS. The time-based location update registration timer needs to change when the MS requests to change the paging cycle or when the system controller determines to change the paging cycle of the MS. When the paging cycle of the MS gets longer or shorter than the current paging cycle, a device-specific time-based location update registration timer of the MS can be lengthened or shortened according to the corresponding paging cycle, or the time-based location update registration timer globally applied to the system can be adopted.

When it is determined that it is not necessary to change the time-based location update registration timer of the MS in step 603, the system controller performs the remaining location update registration process and terminates the location update process in step 609, and then finishes this process.

In contrast, when it is determined that it is necessary to change the time-based location update registration timer of the MS in step 603, the system controller removes the device-specific time-based location update registration timer of the MS and determines whether to apply the time-based location update registration timer globally applied in the system, to the MS in step 605.

When it is determined to remove the device-specific time-based location update registration timer of the MS and to apply the time-based location update registration timer globally applied in the system, to the MS in step 605, the system controller determines and applies the time-based location update registration timer globally applied in the system, as the timer for the MS to use in the time-based location update registration process in the idle mode, and transmits to the MS a time-based location update registration timer application indicator indicating the application of the global time-based location update registration timer of the system in step 607. Herein, the time-based location update registration timer application indicator information can be contained in the location update registration response message received at the MS during the location update registration process, an exemplary construction of which is shown in Table 3.

TABLE 3

| Field | Description |
| --- | --- |
| Global idle mode timer indicator | Indicate to use global idle mode timer to conduct timer based location update. |

Alternatively, the system controller can transmit to the MS, the global time-based location update registration timer of the system, instead of the time-based location update registration timer application indicator. Herein, the global time-based location update registration timer information of the system can be contained in the location update registration response message received at the MS during the location update registration process, an exemplary construction of which is shown in Table 4.

TABLE 4

| Field | Description |
| --- | --- |
| Global idle mode timer | (Globally applied) MS timed interval to conduct timer based location update. Timer recycles on successful idle mode location update. |

Herein, the location update registration response message including the information of Table 3 or Table 4 is a control message transmitted from the base station to the MS, and the system controller instructs the base station to provide the MS with the information of Table 3 or Table 4 using another control message.

Next, the system controller performs the remaining location update registration process and terminates the location update registration process in step 609, and then finishes this process.

In contrast, when it is determined not to apply the time-based location update registration timer globally applied in the system, to the MS in step 605, the system controller determines and applies a new time-based location update registration timer adequate for the MS, as the timer for the MS to use in the time-based location update registration process in the idle mode, based on the characteristics of the service (e.g., the M2M service) subscribed to by the MS and transmits to the MS the determined new device-specific time-based location update registration timer in step 611, and then proceeds to step 609. Herein, the new device-specific time-based location update registration timer information can be contained in the location update registration response message received at the MS during the location update registration process, an exemplary construction of which is shown in Table 1. The location update registration response message is the control message transmitted from the base station to the MS, and the system controller instructs the base station to provide the new time-based location update registration timer information to the MS using another control message.

Figure 7:
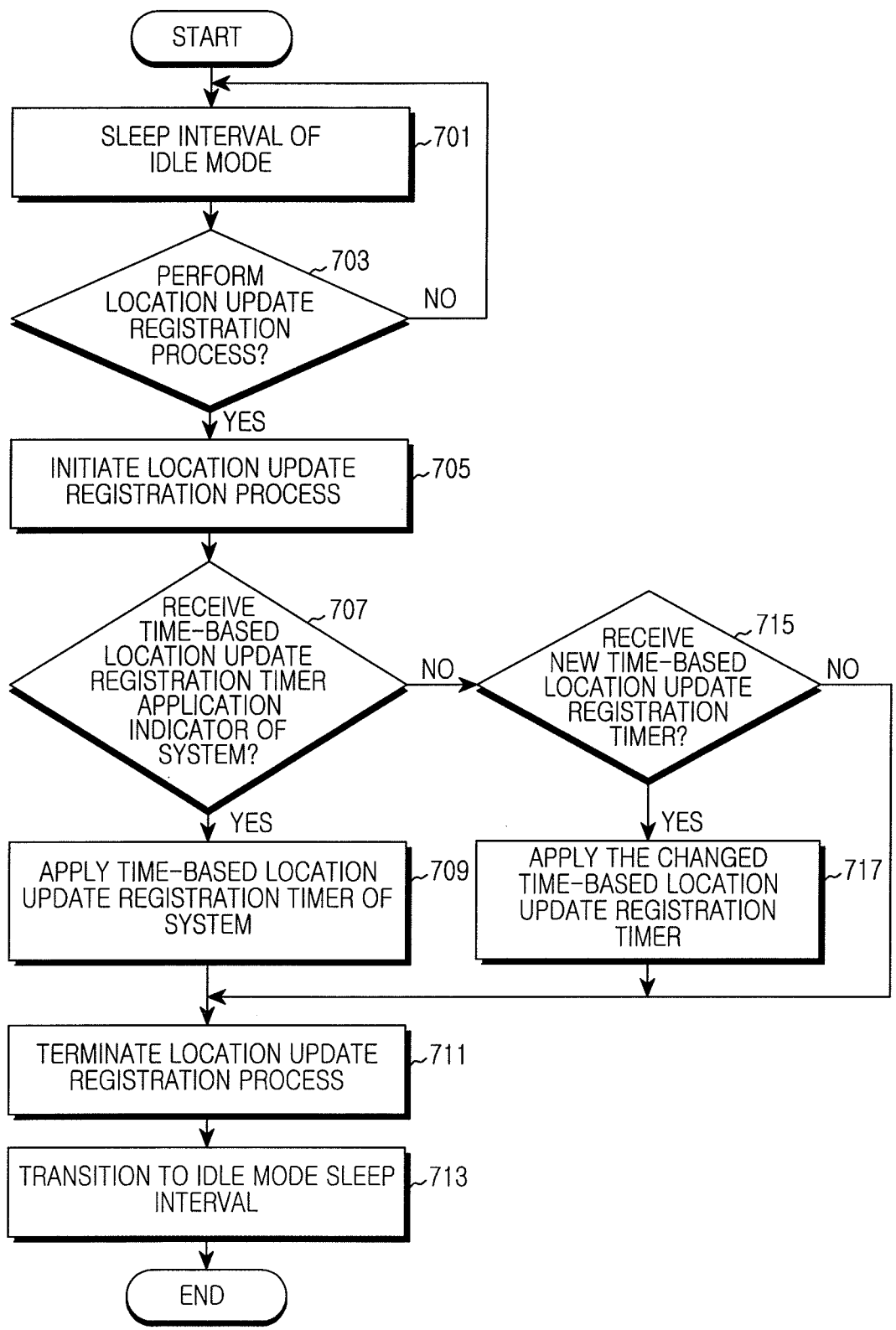
FIG. 7 is a flowchart of a method of a mobile station for processing a changed location update registration timer in an idle mode in a M2M communication system according to an exemplary embodiment of the present invention.

FIG. 7 is a flowchart of a method of a MS for processing a changed location update registration timer in an idle mode of a M2M communication system according to an exemplary embodiment of the present invention.

Referring to FIG. 7, the MS operates in a sleep interval of the idle mode in step 701 and determines whether it is time to perform the location update registration process in step 703. The location update registration process can be carried out when a condition set in the system is satisfied, for example, when the MS leaves its paging group or when the time-based location update registration timer expires, and when a condition arbitrarily set by the MS is satisfied.

When it is determined not to be the time to perform the location update registration process in step 703, the MS returns to step 701.

In contrast, when it is determined to be the time to perform the location update registration process in step 703, the MS leaves the sleep interval of the idle mode and initiates the location update registration process in step 705.

In step 707, the MS determines whether the time-based location update registration timer application indicator indicating to apply the time-based location update registration timer globally applied in the system is received. Herein, the time-based location update registration timer application indicator information can be contained in the location update registration response message received at the MS in the location update registration process, an exemplary construction of which is shown in Table 3. Alternatively, instead of the time-based location update registration timer application indicator information, the time-based location update registration timer globally applied in the system can be received. Herein, the time-based location update registration timer information globally applied in the system can be contained in the location update registration response message received at the MS in the location update registration process, an exemplary construction of which is shown in Table 4.

Upon determining that the time-based location update registration timer application indicator of the system has been received in step 707, the MS applies the received time-based location update registration timer globally applied in the system, as the timer to use in the time-based location update registration process in the idle mode in step 709, performs the remaining location update registration process and terminates the location update registration process in step 711, and proceeds to step 713. The MS transitions to the sleep interval of the idle mode in step 713 and then finishes this process.

In contrast, when determining that the time-based location update registration timer application indicator of the system has not been received in step 707, the MS determines whether the new device-specific time-based location update registration timer is received in step 715. Herein, the new device-specific time-based location update registration timer information can be contained in the location update registration response message received at the MS in the location update registration process, an exemplary construction of which is shown in Table 1.

If it is determined that the new device-specific time-based location update registration timer is received in step 715, the MS applies the received new time-based location update registration timer as the timer to use in the time-based location update registration process in the idle mode in step 717, and proceeds to step 711.

If it is determined that the new time-based location update registration timer is not received in step 715, the MS continuously applies the current location update registration timer as the timer to use in the time-based location update registration process in the idle mode, and then proceeds to step 711.

Figure 8:
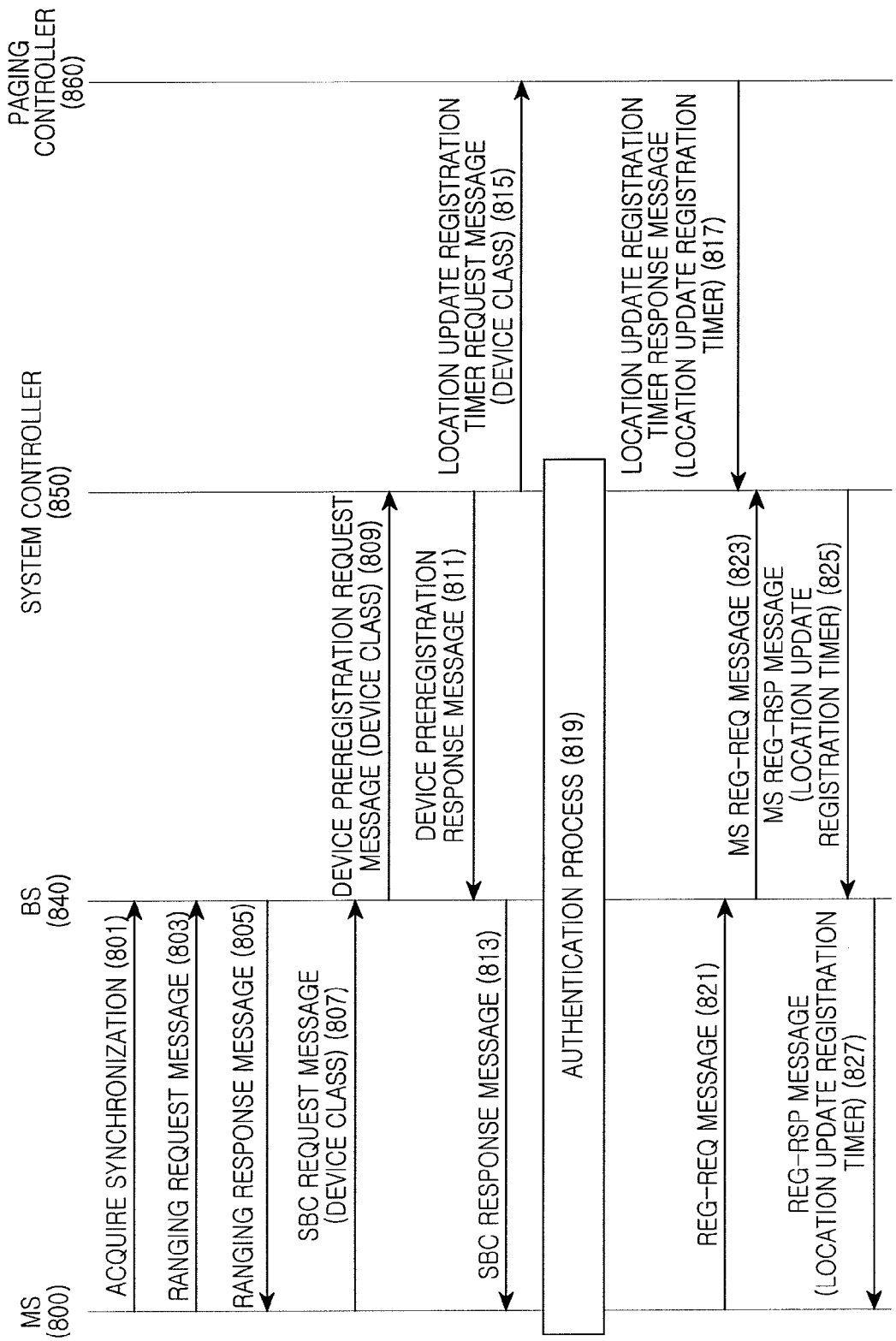
FIG. 8 is a signal flow diagram of a method for processing a time-based location update registration timer of a mobile station in a device registration process in a M2M communication system according to an exemplary embodiment of the present invention.

FIG. 8 is a signal flow diagram of a method for processing a time-based location update registration timer of a MS in a device registration process in a M2M communication system according to an exemplary embodiment of the present invention.

Referring to FIG. 8, the MS 800 acquires synchronization for the Base Station (BS) 840 by transmitting a signal to the BS 840 in step 801, and transmits a ranging request message to the BS 840 in step 803. The BS 840 receiving the ranging request message transmits a ranging response message to the MS 800 in step 805.

The MS 800 receiving the ranging response message transmits a Subscribe station Basic Capability (SBC) request message including device class information to the BS 840 in step 807. Herein, the device class information indicates M2M communication characteristics of the MS 800. The BS 840 receiving the SBC request message transmits an MS preregistration request message including the device class information to the system controller 850 in step 809. Herein, the system controller 850 may be an ASN gateway (ASN-GW) and may correspond to a relay Paging Controller (PC).

The system controller 850 receiving the MS preregistration request message transmits an MS preregistration response message to the BS 840 in step 811, and the BS 840 receiving the MS preregistration response message transmits an SBC response message to the MS 800 in step 813.

The system controller 850 transmits a location update registration timer request message to the paging controller 860 to request the location update registration timer information for the device class of the MS 800 in step 815. Herein, the paging controller 860 corresponds to an anchor paging controller. The paging controller 860 receiving the location update registration timer request message transmits a location update registration timer response message including the corresponding location update registration timer information of the MS 850 to the system controller 850 in step 817.

Meanwhile, the MS 800 receiving the SBC response message performs an authentication process with the BS 840 and the system controller 850 in step 819, and transmits a REG-REQ message to the BS 840 in step 821. The BS 840 receiving the REG-REQ message transmits an MS REG-REQ message to the system controller 850 in step 823. The system controller 850 receiving the MS REG-REQ message transmits an MS REG-RSP message including the location update registration timer information of the MS 800 to the BS 840 in step 825. The BS 840 receiving the MS REG-RSP message transmits a REG-RSP message including the location update registration timer information to the MS 800 in step 827.

While the location update registration timer information is delivered by the REG-RSP message in FIG. 8, the location update registration timer information may be carried by the idle mode entry response message when the MS 800 enters the idle mode.

In FIG. 8, the BS 840 and the system controller 850 are represented as separate entities. Yet, in other exemplary embodiments, the BS 840 and the system controller 850 can be constituted as a single entity. That is, the BS 840 can belong to the system controller 850. In this case, steps 809, 811, 823, and 825 are the signaling within the system controller 850.

In FIG. 8, the system controller 850 and the paging controller 860 are represented as separate entities. Yet, in other exemplary embodiments, the system controller 850 and the paging controller 860 can be constituted as a single entity. That is, the paging controller 860 can belong to the system controller 850. In this case, steps 815 and 817 are the signaling within the system controller 850.

So far, the location update registration timer information is obtained from the control message during the device registration process or the idle mode negotiation process of the MS. In other exemplary embodiments, since the location update registration timer information is one information of the device class obtained when the MS subscribes to the M2M communication service, it is possible to consider a case where the MS does not need to obtain the location update registration timer information using the separate control message as above. In this case, a scenario can be considered to allow the MS to provide its device class information to the paging controller so that the paging controller can obtain the location update registration timer information obtained by the MS in advance, which is described below with reference to FIG. 9.

Figure 9:
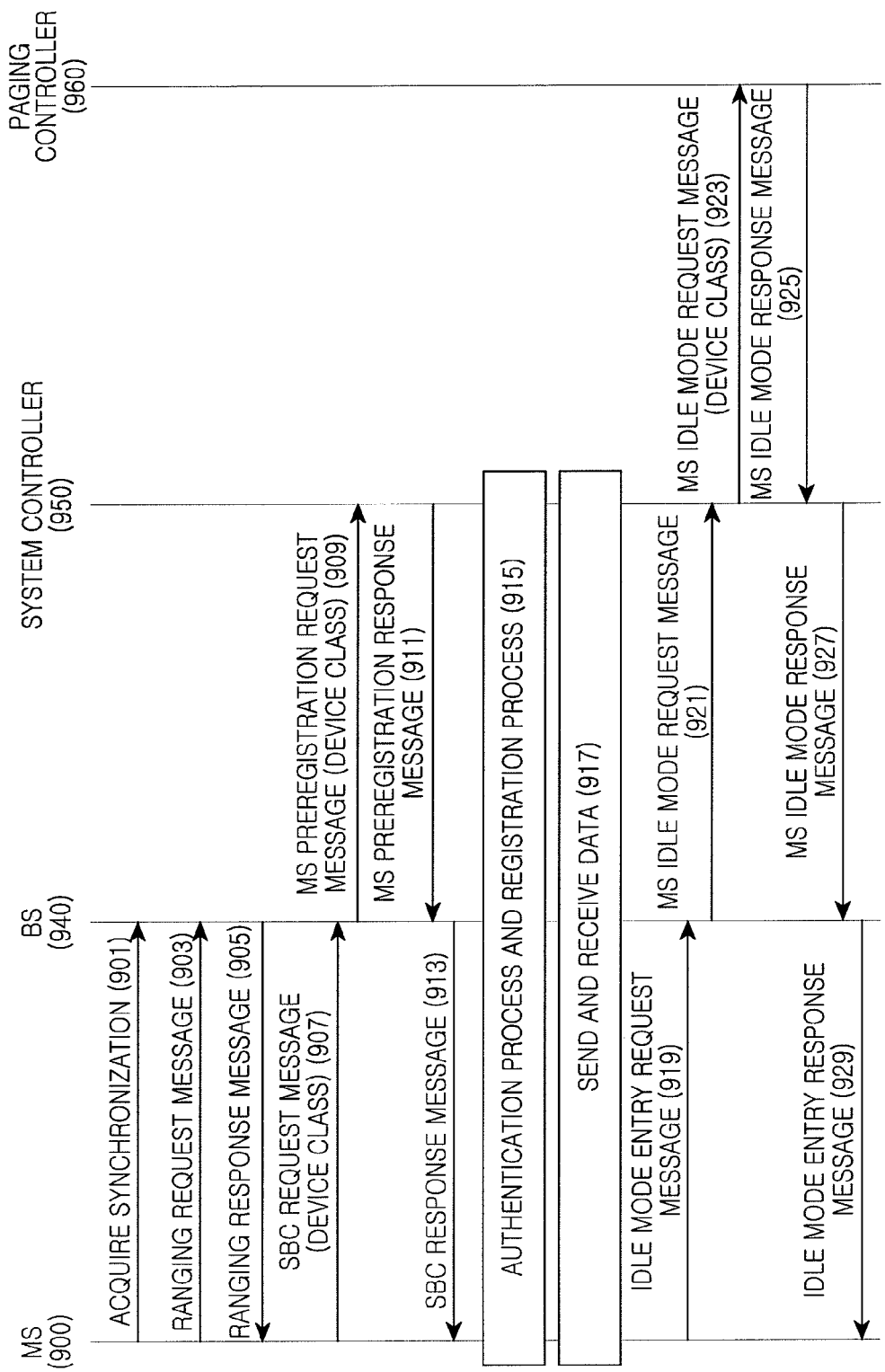
FIG. 9 is a signal flow diagram of a method for processing a time-based location update registration timer of a mobile station in an idle mode negotiation process in a M2M communication system according to another exemplary embodiment of the present invention.

FIG. 9 is a signal flow diagram of a method for processing a time-based location update registration timer of a MS in an idle mode negotiation process in a M2M communication system according to another exemplary embodiment of the present invention.

Referring to FIG. 9, the MS 900 acquires synchronization for the BS 940 by transmitting a signal to the BS 940 in step 901, and transmits a ranging request message to the BS 940 in step 903. The BS 940 receiving the ranging request message transmits a ranging response message to the MS 900 in step 905.

The MS 900 receiving the ranging response message transmits an SBC request message including the device class information to the BS 940 in step 907. Herein, the device class information includes the characteristics of the M2M communication service subscribed to by the MS 900, and the idle mode characteristics (i.e., the location update registration timer). The BS 940 receiving the SBC request message transmits an MS preregistration request message including the device class information to the system controller 950 in step 909. Herein, the system controller 950 may be the ASN-GW and may correspond to the relay paging controller.

The system controller 950 receiving the MS preregistration request message transmits an MS preregistration response message to the BS 940 in step 911, and the BS 940 receiving the MS preregistration response message transmits an SBC response message to the MS 900 in step 913.

The MS 900, the BS 940, and the system controller 950 perform the authentication process and the registration process in step 915. The MS 900 transmits and receives data via the BS 940 and the system controller 950 in step 917.

Meanwhile, when the MS 900 transmitting and receiving the data intends to enter the idle mode, the MS 900 transmits an idle mode entry request message to the BS 940 in step 919. The BS 940 receiving the idle mode entry request message transmits an MS idle mode request message of the MS to the system controller 950 in step 921.

The system controller 950 receiving the MS idle mode request message transmits to the paging controller 960 an MS idle mode request message requesting the idle mode information of the MS 900 in step 923. Herein, the MS idle mode request message includes the device class information of the MS 900, and the paging controller 960 corresponds to the anchor paging controller. The paging controller 960 receiving the MS idle mode request message acquires and manages the location update registration timer information of the MS 900 based on the device class information of the MS 900, and transmits to the system controller 950 an MS idle mode response message including information of a parameter applied by the MS 900 in the idle mode in step 925.

The system controller 950 receiving the MS idle mode response message transmits the idle mode response message including the idle mode parameter information to the BS 940 in step 927. The BS 940 receiving the MS idle mode response message transmits an idle mode entry response message including the idle mode parameter information to the MS 900 in step 929.

Next, the MS 900 receiving the idle mode entry response message and the paging controller 960 operate in the idle mode and apply the location update registration timer.

In FIG. 9, the BS 940 and the system controller 950 are represented as separate entities. Yet, in other exemplary embodiments, the BS 940 and the system controller 950 can be constituted as a single entity. That is, the BS 940 can belong to the system controller 950. In this case, steps 909, 911, 921, and 927 are the signaling within the system controller 950.

In FIG. 9, the system controller 950 and the paging controller 960 are represented as separate entities. Yet, in other exemplary embodiments, the system controller 950 and the paging controller 960 can be constituted as a single entity. That is, the paging controller 960 can belong to the system controller 950. In this case, steps 923 and 925 are the signaling within the system controller 950.

Figure 10:
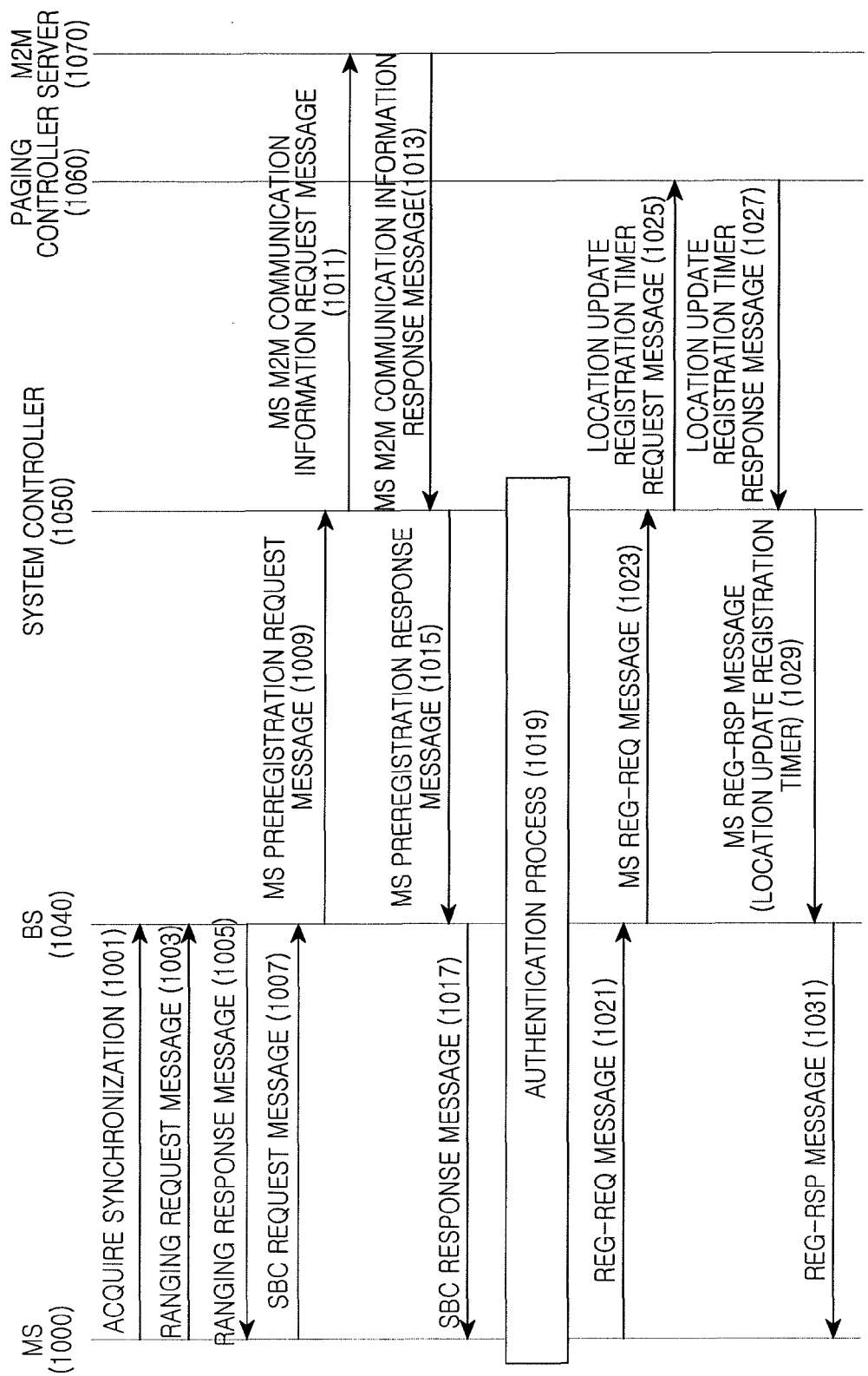
FIG. 10 is a signal flow diagram of a method for processing a time-based location update registration timer of a mobile station in a device registration process in a M2M communication system according to yet another exemplary embodiment of the present invention.

FIG. 10 is a signal flow diagram of a method for processing a time-based location update registration timer of a MS in a device registration process in a M2M communication system according to yet another exemplary embodiment of the present invention.

Referring to FIG. 10, the MS 1000 acquires synchronization for the BS 1040 by transmitting a signal to the BS 1040 in step 1001, and transmits a ranging request message to the BS 1040 in step 1003. The BS 1040 receiving the ranging request message transmits a ranging response message to the MS 1000 in step 1005.

The MS 1000 receiving the ranging response message transmits an SBC request message for negotiating about basic capability of the MS 1000 to the BS 1040 in step 1007. Herein, the SBC request message can include the device class information informing of the M2M communication characteristics of the MS 1000. The BS 1040 receiving the SBC request message transmits an MS preregistration request message of the MS 1000 to the system controller 1050 in step 1009. Herein, the system controller 1050 may be the ASN-GW and may correspond to the relay paging controller.

The system controller 1050 receiving the MS preregistration request message transmits an MS M2M communication information request message to an M2M server 1070, which controls the M2M communication service of the MS 1000, in step 1011. The M2M server 1070 transmits an MS M2M communication information response message including the M2M communication information of the MS 1000 in step 1013. The MS M2M communication information response message includes information about whether the device requires the location update registration timer information of the MS 1000 alone. For example, the MS M2M communication information response message can include the device class information.

The system controller 1050 transmits an MS preregistration response message to the BS 1040 in step 1015, and the BS 1040 receiving the MS preregistration response message transmits an SBC response message to the MS 1000 in step 1017.

The MS 1000 receiving the SBC response message performs the authentication process with the BS 1040 and the system controller 1050 in step 1019 and transmits a REG-REQ message to the BS 1040 in step 1021. The BS 1040 receiving the REG-REQ message transmits an MS REG-REQ message to the system controller 1050 in step 1023.

The system controller 1050 requests the location update registration timer information adequate for the device class of the MS 1000 by transmitting a location update registration timer request message to the paging controller 1060 in step 1025. Herein, the paging controller 1060 corresponds to the anchor paging controller. The paging controller 1060 receiving the location update registration timer request message transmits a location update registration timer response message including the location update registration timer information corresponding to the MS 1000, to the system controller 1050 in step 1027.

The system controller 1050 transmits an MS REG-RSP message including the location update registration timer information of the MS 1000 to the BS 1040 in step 1029. The BS 1040 receiving the MS REG-RSP message transmits a REG-RSP message including the location update registration timer information to the MS 1000 in step 1031.

In FIG. 10, the BS 1040 and the system controller 1050 are represented as separate entities. Yet, in other exemplary embodiments, the BS 1040 and the system controller 1050 can be constituted as a single entity. That is, the BS 1040 can belong to the system controller 1050. In this case, steps 1009, 1011, 1023, and 1029 are the signaling within the system controller 1050.

In FIG. 10, the system controller 1050 and the paging controller 1060 are represented as separate entities. Yet, in other exemplary embodiments, the system controller 1050 and the paging controller 1060 can be constituted as a single entity. That is, the paging controller 1060 can belong to the system controller 1050. In this case, steps 1023 and 1027 are the signaling within the system controller 1050.

Figure 11:
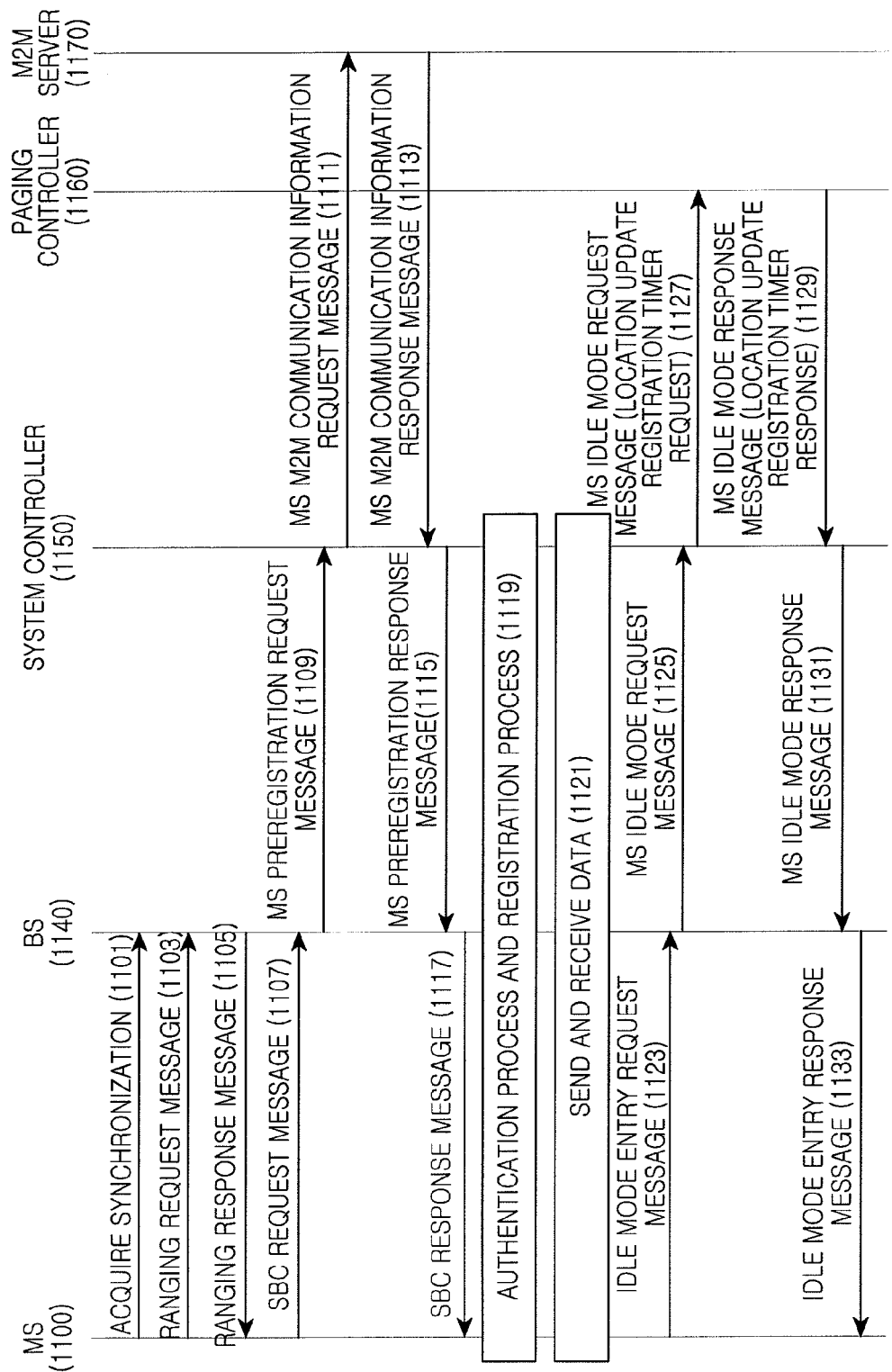
FIG. 11 is a signal flow diagram of a method for processing a time-based location update registration timer of a mobile station in an idle mode negotiation process in a M2M communication system according to yet another exemplary embodiment of the present invention.

FIG. 11 is a signal flow diagram of a method for processing a time-based location update registration timer of a MS in an idle mode negotiation process of a M2M communication system according to yet another exemplary embodiment of the present invention.

Referring to FIG. 11, the MS 1100 acquires synchronization for the BS 1140 by transmitting a signal to the BS 1140 in step 1101, and transmits a ranging request message to the BS 1140 in step 1103. The BS 1140 receiving the ranging request message transmits a ranging response message to the MS 1100 in step 1105.

The MS 1100 receiving the ranging response message transmits an SBC request message to the BS 1140 in step 1107. Herein, the SBC request message includes the characteristics of the M2M communication service subscribed to by the MS 1100 and the device class information. The BS 1140 receiving the SBC request message transmits an MS preregistration request message of the MS 1100 to the system controller 1150 in step 1109. Herein, the system controller 1150 is the ASN-GW and corresponds to the relay paging controller.

The system controller 1150 receiving the MS preregistration request message transmits an MS M2M communication information request message to an M2M server 1170 which controls the M2M communication service of the MS 1100 in step 1111. The M2M server 1170 transmits an MS M2M communication information response message including the M2M communication information of the MS 1100 in step 1113. The MS M2M communication information response message includes information about whether the device requires the location update registration timer information of the MS 1100 alone. For example, the MS M2M communication information response message can include the device class information.

The system controller 1150 transmits an MS preregistration response message to the BS 1140 in step 1115, and the BS 1140 receiving the MS preregistration response message transmits an SBC response message to the MS 1100 in step 1117.

The MS 1100, the BS 1140, and the system controller 1150 perform the authentication process and the registration process in step 1119. The MS 1100 transmits and receives data via the BS 1140 and the system controller 1150 in step 1121.

Meanwhile, when the MS 1100 transmitting and receiving the data intends to enter the idle mode, the MS 1100 transmits an idle mode entry request message to the BS 1140 in step 1123. The BS 1140 receiving the idle mode entry request message transmits an MS idle mode request message of the MS 1100 to the system controller 1150 in step 1125.

The system controller 1150 receiving the MS idle mode request message transmits to the paging controller 1160 an MS idle mode request message requesting the idle mode information of the MS 1100 in step 1127. Herein, the MS idle mode request message includes the device class information of the MS 1100 the location update process timer request of the MS 1100 alone, and the paging controller 1160 corresponds to the anchor paging controller. The paging controller 1160 receiving the MS idle mode request message acquires and manages the location update registration timer information of the MS 1100 based on the device class information of the MS 1100, and transmits to the system controller 1150 an MS idle mode response message including information of a parameter applied by the MS 1100 in the idle mode in step 1129.

The system controller 1150 receiving the MS idle mode response message transmits the MS idle mode response message including the idle mode parameter information to the BS 1140 in step 1131. The BS 1140 receiving the MS idle mode response message transmits an idle mode entry response message including the idle mode parameter information to the MS 1100 in step 1133.

Next, the MS 1100 receiving the idle mode entry response message and the paging controller 1160 operate in the idle mode and apply the location update registration timer.

In FIG. 11, the BS 1140 and the system controller 1150 are represented as separate entities. Yet, in other exemplary embodiments, the BS 1140 and the system controller 1150 can be constituted as a single entity. That is, the BS 1140 can belong to the system controller 1150. In this case, steps 1109, 1115, 1125, and 1131 are the signaling within the system controller 1150.

In FIG. 11, the system controller 1150 and the paging controller 1160 are represented as separate entities. Yet, in other exemplary embodiments, the system controller 1150 and the paging controller 1160 can be constituted as a single entity. That is, the paging controller 1160 can belong to the system controller 1150. In this case, steps 1127 and 1129 are the signaling within the system controller 1150.

The M2M communication system of exemplary embodiments of the present invention considers the support for an idle mode of a device without frequent data transmission and reception and defines a new location update registration timer for the MS which operates in the idle mode using a long paging cycle. Therefore, the control signal overhead of the location update registration process and the power consumption of the device can be reduced by preventing the location update registration process at the same cycle as the general idle MS; that is, by preventing an unnecessary location update registration process.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for an operation of a system controller in a system supporting machine-to-machine (M2M) communication, the method comprising:
   generating a first message that instructs to enter an idle mode and comprises a device-specific idle mode timer, the device-specific idle mode timer indicating a maximum time interval between two consecutive location updates during the idle mode; and
   transmitting the first message to an mobile station (MS) to enter into the idle mode.

2. The method of claim 1, further comprising:
   determining whether it is necessary to change the device-specific idle mode timer of the MS;
   if it is determined to be necessary to change the timer, determining whether the system global location update registration timer is applicable to the MS;
   if it is determined that the system global location update registration timer is applicable, transmitting a second message, informing of the system global location update registration timer, to the MS; and
   if it is determined that the system global location update registration timer is not applicable, determining a new device-specific idle mode timer for the MS and transmitting a third message, informing of the new device-specific idle mode timer, to the MS.

3. The method of claim 2, wherein the second message comprises one of an indicator indicating the application of the system global location update registration timer and a value of the system global location update registration timer.

4. The method of claim 2, wherein the second message and the third message comprises a location update registration response message transmitted in a downlink during a location update registration process of the MS.

5. The method of claim 1, further comprising:
   if the MS supports a paging cycle being greater than a reference value, determining to apply the device-specific idle mode timer to the MS.

6. The method of claim 5, further comprising:
   determining whether the MS supports the paging cycle greater than the reference value; and
   if it is determined that the MS supports the paging cycle greater than the reference value, determining that a system global location update registration timer is not applied.

7. The method of claim 1, further comprising:
   determining the device-specific idle mode timer for the MS.

8. The method of claim 7, wherein the determining of the device-specific idle mode timer comprises:
   receiving a message, comprising device class information indicating M2M communication characteristics of the MS, from one of the MS and a Base Station (BS);
   transmitting a message, comprising the device class information and requesting a device-specific idle mode timer value for the MS, to a paging controller; and
   receiving a message, comprising the device-specific idle mode timer value for the MS, from the paging controller.

9. The method of claim 7, wherein the determining of the device-specific idle mode timer comprises:
   transmitting a message, requesting device class information indicating M2M communication characteristics of the MS, to a server which manages the M2M communication;
   receiving a message, comprising the device class information, from the server;
   transmitting a message, comprising the device class information and requesting a device-specific idle mode timer value for the MS, to a paging controller; and
   receiving a message, comprising the device-specific idle mode timer value for the MS, from the paging controller.

10. The method of claim 7, wherein the determining of the device-specific idle mode timer comprises:
   receiving a message, comprising device class information indicating M2M communication characteristics of the MS, from one of the MS and a Base Station (BS); and determining a device-specific idle mode timer value for the MS by considering the M2M communication characteristics.

11. The method of claim 7, wherein the determining of the device-specific idle mode timer comprises:
   transmitting a message, requesting device class information indicating M2M communication characteristics of the MS, to a server which manages the M2M communication;
   receiving a message, comprising the device class information, from the server; and
   determining a device-specific idle mode timer value for the MS by considering the M2M communication characteristics.

12. The method of claim 1, wherein the maximum interval indicated by the device-specific idle mode timer is determined based on an M2M service subscribed by the MS.

13. A method for an operation of a mobile station (MS) in a system supporting machine-to-machine (M2M) communication, the method comprising:
   receiving a first message that instructs to enter an idle mode and comprises a device-specific idle mode timer, the device-specific idle mode timer indicating a maximum time interval between two consecutive location updates during the idle mode; and
   performing a location update registration process if the device-specific idle mode timer expires.

14. The method of claim 13, further comprising:
   receiving one of a second message informing of a system global location update registration timer and a third message informing of a new device-specific idle mode timer during the location update registration process;
   if the second message is received, applying the system global location update registration timer; and
   if the third message is received, applying the new device-specific idle mode timer.

15. The method of claim 14, wherein the second message comprises one of an indicator indicating the application of the system global location update registration timer and a value of the system global location update registration timer.

16. The method of claim 14, wherein the second message and the third message comprise a location update registration response message transmitted in a downlink during the location update registration process of the MS.

17. The method of claim 13, wherein the maximum interval indicated by the device-specific idle mode timer is determined based on an M2M service subscribed by the MS.

18. An apparatus of a system controller in a system supporting machine-to-machine (M2M) communication, the apparatus comprising:
   a controller configured to generate a first message that instructs to enter an idle mode and comprises a device-specific idle mode timer, the device-specific idle mode timer indicating a maximum time interval between two consecutive location updates during the idle mode; and
   a transceiver configured to transmit the first message to an mobile station (MS) to enter into the idle mode.

19. The apparatus of claim 18, wherein the controller determines whether it is necessary to change a timer of the MS, and determines whether the system global location update registration timer is applicable to the MS if the controller determines it is necessary to change the timer, and
   if the controller determines that the system global location update registration timer is applicable, the transceiver transmits a second message, informing of the system global location update registration timer, to the MS, and
   if the controller determines that the system global location update registration timer is not applicable, the transceiver transmits a third message, informing of a new device-specific idle mode timer for the MS, to the MS.

20. The apparatus of claim 19, wherein the second message comprises one of an indicator indicating the application of the system global location update registration timer and a value of the system global location update registration timer.

21. The apparatus of claim 19, wherein the second message and the third message comprises a location update registration response message transmitted in a downlink during a location update registration process of the MS.

22. The apparatus of claim 18, wherein the controller determines to apply the device-specific idle mode timer to the MS, if the MS supports a paging cycle being greater than a reference value.

23. The apparatus of claim 22, wherein the controller determines whether the MS supports a paging cycle greater than a reference value, and determines that the system global location update registration timer is not applied if it is determined that the MS supports a paging cycle greater than a reference value.

24. The apparatus of claim 18, wherein the controller determines the device-specific idle mode timer for the MS.

25. The apparatus of claim 24, wherein, to determine the device-specific idle mode timer, the controller controls to receive a message, comprising device class information indicating M2M communication characteristics of the MS, from one of the MS and a Base Station (BS), to transmit a message, comprising the device class information and requesting a timer value for the MS, to a paging controller, and to receive a message, comprising the timer value for the MS, from the paging controller.

26. The apparatus of claim 24, wherein, to determine the device-specific idle mode timer, the controller controls to transmit a message, requesting device class information indicating M2M communication characteristics of the MS, to a server which manages the M2M communication, to receive a message, comprising the device class information, from the server, to transmit a message, comprising the device class information and requesting a timer value for the MS, to a paging controller, and to receive a message, comprising the timer value for the MS, from the paging controller.

27. The apparatus of claim 24, wherein, to determine the device-specific idle mode timer, the controller controls to receive a message, comprising device class information indicating M2M communication characteristics of the MS, from one of the MS and a Base Station (BS), and determines a timer value for the MS by considering the M2M communication characteristics.

28. The apparatus of claim 24, wherein, to determine the device-specific idle mode timer, the controller controls to transmit a message, requesting device class information indicating M2M communication characteristics of the MS, to a server which manages the M2M communication, controls to receive a message, comprising the device class information, from the server, and determines a timer value for the MS by considering the M2M communication characteristics.

29. The apparatus of claim 18, wherein the maximum interval indicated by the device-specific idle mode timer is determined based on an M2M service subscribed by the MS.

30. An apparatus of a mobile station (MS) in a system supporting machine-to-machine (M2M) communication, the apparatus comprising:
   a transceiver configured to receive a first message that instructs to enter an idle mode and comprises a device-specific idle mode timer, the device-specific idle mode timer indicating a maximum time interval between two consecutive location updates during the idle mode; and a controller configured to perform a location update registration process if the device-specific idle mode timer expires.

31. The apparatus of claim 30, wherein the transceiver receives one of a second message informing of a system global location update registration timer and a third message informing of a new device-specific idle mode timer during the location update registration process, and if the second message is received, the controller applies the system global location update registration timer, and if the third message is received, the controller applies the new device-specific idle mode timer.

32. The apparatus of claim 31, wherein the second message comprises one of an indicator indicating the application of the system global location update registration timer and a value of the system global location update registration timer.

33. The apparatus of claim 31, wherein the second message and the third message comprise a location update registration response message transmitted in a downlink during the location update registration process of the MS.

34. The apparatus of claim 30, wherein the maximum interval indicated by the device-specific idle mode timer is determined based on an M2M service subscribed by the MS.

* * * * *